United States Patent
Saito et al.

(10) Patent No.: US 9,262,091 B2
(45) Date of Patent: Feb. 16, 2016

(54) STORAGE CONTROL APPARATUS FOR COPYING VOLUME, AND COPYING METHOD

(71) Applicant: FUJITSU LIMITED, Kawasaki-shi, Kanagawa (JP)

(72) Inventors: Kinya Saito, Kawasaki (JP); Masato Kawamura, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 14/029,914

(22) Filed: Sep. 18, 2013

(65) Prior Publication Data
US 2014/0095820 A1  Apr. 3, 2014

(30) Foreign Application Priority Data

Sep. 28, 2012  (JP) ................... 2012-217010

(51) Int. Cl.
G06F 3/06 (2006.01)
(52) U.S. Cl.
CPC .............. G06F 3/065 (2013.01); G06F 3/0604 (2013.01); G06F 3/0619 (2013.01); G06F 3/0673 (2013.01); G06F 3/0683 (2013.01)
(58) Field of Classification Search
None
See application file for complete search history.

(56) References Cited

U.S. PATENT DOCUMENTS

| 5,402,428 | A | 3/1995 | Kakuta et al. |
| 6,243,824 | B1 | 6/2001 | Kakuta et al. |
| 2004/0260894 | A1* | 12/2004 | Keohane et al. .............. 711/162 |
| 2006/0218346 | A1 | 9/2006 | Nagumo et al. |
| 2008/0282049 | A1 | 11/2008 | Kawamura et al. |
| 2010/0318756 | A1 | 12/2010 | Yoshinari et al. |

FOREIGN PATENT DOCUMENTS

| EP | 1990721 | 11/2008 |
| JP | 3-292525 | 12/1991 |
| JP | 6-149487 | 5/1994 |
| JP | 9-325863 | 12/1997 |
| JP | 2913840 | 6/1999 |
| JP | 2006-268139 | 10/2006 |
| JP | 2008-282241 | 11/2008 |
| JP | 2010-066979 | 3/2010 |
| JP | 2010-122761 | 6/2010 |
| JP | 2011-002876 | 1/2011 |

* cited by examiner

Primary Examiner — Daniel Tsui
(74) Attorney, Agent, or Firm — Fujitsu Patent Center

(57) ABSTRACT

A storage control apparatus includes: a copy processing unit to perform a first copy process of copying, when receiving a write request targeting on a write destination address with a copy of a copy source volume to a copy destination volume being not yet completed, write data of the write destination address to the copy destination volume, and to perform a second copy process, when executing a copy process of an overall storage area of the copy source volume, according to a copy sequence on a management area unit basis of management areas into which the overall storage area is segmented; and a copy sequence resetting unit to reset the copy sequences on the basis of a reception timing of the write request received during the second copy process by the copy processing unit and a write destination address.

6 Claims, 15 Drawing Sheets

FIG. 3

| | MON | TUE | WED | THU | FRI | SAT | SUN |
|---|---|---|---|---|---|---|---|
| VOLUME A (COPY PROCESS IS STARTED AT 20:00 ON MONDAY THROUGH FRIDAY OF EVERY WEEK) | ↕ | ↕ | ↕ | ↕ | ↕ | | |
| VOLUME B (COPY PROCESS IS STARTED AT 12:00 ON SATURDAY OF EVERY WEEK) | | | | | | ↕ | |
| VOLUME C (COPY PROCESS IS STARTED AT 6:00 ON SUNDAY OF EVERY WEEK) | | | | | | | ↕ |

FIG. 6

PROCESSING TARGET VOLUME
(COPY SOURCE VOLUME)

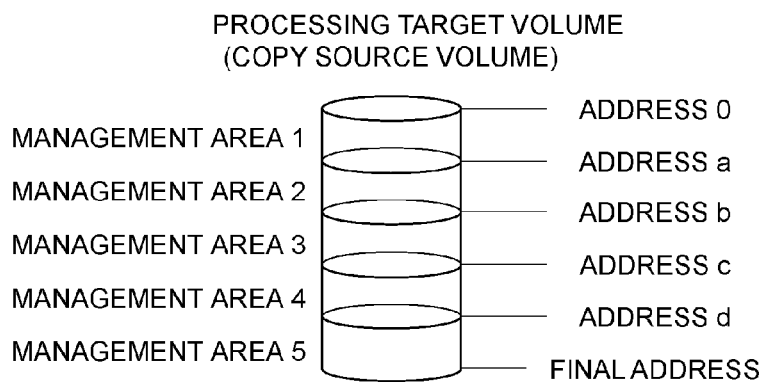

MANAGEMENT AREA 1 — ADDRESS 0
MANAGEMENT AREA 2 — ADDRESS a
MANAGEMENT AREA 3 — ADDRESS b
MANAGEMENT AREA 4 — ADDRESS c
MANAGEMENT AREA 5 — ADDRESS d
— FINAL ADDRESS

FIG. 7

|  | TIME SEGMENT 1 | TIME SEGMENT 2 | TIME SEGMENT 3 | TIME SEGMENT 4 | TIME SEGMENT 5 |
|---|---|---|---|---|---|
| MANAGEMENT AREA 1 | $n_{1-1}$ | $n_{1-2}$ | $n_{1-3}$ | $n_{1-4}$ | $n_{1-5}$ |
| MANAGEMENT AREA 2 | $n_{2-1}$ | $n_{2-2}$ | $n_{2-3}$ | $n_{2-4}$ | $n_{2-5}$ |
| MANAGEMENT AREA 3 | $n_{3-1}$ | $n_{3-2}$ | $n_{3-3}$ | $n_{3-4}$ | $n_{3-5}$ |
| MANAGEMENT AREA 4 | $n_{4-1}$ | $n_{4-2}$ | $n_{4-3}$ | $n_{4-4}$ | $n_{4-5}$ |
| MANAGEMENT AREA 5 | $n_{5-1}$ | $n_{5-2}$ | $n_{5-3}$ | $n_{5-4}$ | $n_{5-5}$ |

$n_{x-y}$: WRITE REQUEST COUNT TO MANAGEMENT AREA x IN TIME SEGMENT y

FIG. 11

|  | TIME SEGMENT 1 | TIME SEGMENT 2 | TIME SEGMENT 3 | TIME SEGMENT 4 | TIME SEGMENT 5 |
|---|---|---|---|---|---|
| MANAGEMENT AREA 1 | 0 | 0 | 0 | 0 | 10 |
| MANAGEMENT AREA 2 | 0 | 0 | 4 | 0 | 0 |
| MANAGEMENT AREA 3 | 1 | 12 | 0 | 0 | 0 |
| MANAGEMENT AREA 4 | 0 | 0 | 0 | 6 | 0 |
| MANAGEMENT AREA 5 | 0 | 0 | 0 | 0 | 0 |

FIG. 12A

| | STATUS | TIME SEGMENT 1 | TIME SEGMENT 2 | TIME SEGMENT 3 | TIME SEGMENT 4 | TIME SEGMENT 5 |
|---|---|---|---|---|---|---|
| MANAGEMENT AREA 1 | UNESTABLISHED | | | | | |
| MANAGEMENT AREA 2 | UNESTABLISHED | | | xxxx | | xxxxxxxxx |
| MANAGEMENT AREA 3 | UNESTABLISHED | x | xxxxxxxxxxxx | | | |
| MANAGEMENT AREA 4 | UNESTABLISHED | | | | xxxxxx | |
| MANAGEMENT AREA 5 | UNESTABLISHED | | | | | |

FIG. 12B

| | STATUS | TIME SEGMENT 1 | TIME SEGMENT 2 | TIME SEGMENT 3 | TIME SEGMENT 4 | TIME SEGMENT 5 |
|---|---|---|---|---|---|---|
| MANAGEMENT AREA 1 | UNESTABLISHED | | | | | xxxxxxxxx |
| MANAGEMENT AREA 2 | UNESTABLISHED | | | xxxx | | |
| MANAGEMENT AREA 3 | ESTABLISHED | x | xxxxxxxxxxxx | | | |
| MANAGEMENT AREA 4 | UNESTABLISHED | | | | xxxxxx | |
| MANAGEMENT AREA 5 | UNESTABLISHED | | | | | |

FIG. 12C

| | STATUS | TIME SEGMENT 1 | TIME SEGMENT 2 | TIME SEGMENT 3 | TIME SEGMENT 4 | TIME SEGMENT 5 |
|---|---|---|---|---|---|---|
| MANAGEMENT AREA 1 | UNESTABLISHED | | | | | xxxxxxxxx |
| MANAGEMENT AREA 2 | UNESTABLISHED | | xxxxxxxxxxx | xxxx | | |
| MANAGEMENT AREA 3 | ESTABLISHED | x | | | | |
| MANAGEMENT AREA 4 | ESTABLISHED | | | | xxxxxx | |
| MANAGEMENT AREA 5 | UNESTABLISHED | | | | | |

FIG. 15A

| | STATUS | TIME SEGMENT 1 | TIME SEGMENT 2 | TIME SEGMENT 3 | TIME SEGMENT 4 | TIME SEGMENT 5 |
|---|---|---|---|---|---|---|
| MANAGEMENT AREA 1 | UNESTABLISHED | ▓ | | | | |
| MANAGEMENT AREA 2 | UNESTABLISHED | | ▓ | | xxxx | |
| MANAGEMENT AREA 3 | UNESTABLISHED | | | xxxx | | xxxxxxxx |
| MANAGEMENT AREA 4 | UNESTABLISHED | | | ▓ | ▓ | |
| MANAGEMENT AREA 5 | UNESTABLISHED | | | | xxxxxx | ▓ |

FIG. 15B

| | STATUS | TIME SEGMENT 1 | TIME SEGMENT 2 | TIME SEGMENT 3 | TIME SEGMENT 4 | TIME SEGMENT 5 |
|---|---|---|---|---|---|---|
| MANAGEMENT AREA 1 | UNESTABLISHED | ▓ | | | | |
| MANAGEMENT AREA 2 | UNESTABLISHED | | ▓ | | xxxx | |
| MANAGEMENT AREA 3 | ESTABLISHED | | | xxxx | | xxxxxxxx |
| MANAGEMENT AREA 4 | UNESTABLISHED | | | ▓ | ▓ | |
| MANAGEMENT AREA 5 | ESTABLISHED | | | | xxxxxx | ▓ |

FIG. 16

| NEW MANAGEMENT AREA 1 (OLD MANAGEMENT AREAS 1 AND 2) | NEW MANAGEMENT AREA 2 (OLD MANAGEMENT AREA 3) | NEW MANAGEMENT AREA 3 (OLD MANAGEMENT AREA 4) | NEW MANAGEMENT AREA 4 (OLD MANAGEMENT AREA 5) |
|---|---|---|---|
| (COPY SEQ. 1) | xxxx | xxxx | |
| | | (COPY SEQ. 3) | xxxxxxxxx |
| | | | (COPY SEQ. 4) |
| | (COPY SEQ. 2) | xxxxx | |

STORAGE CONTROL APPARATUS FOR COPYING VOLUME, AND COPYING METHOD

CROSS-REFERENCE TO RELATED APPLICATION

This application is based upon and claims the benefit of priority of the prior Japanese Patent Application No. 2012-217010, filed on Sep. 28, 2012, the entire contents of which are incorporated herein by reference.

FIELD

The present invention relates to a storage control apparatus, a non-transitory computer-readable recording medium and a copy method.

BACKGROUND

In enterprises etc., data in a storage device are periodically copied (backed up) on a volume-by-volume basis (on a per logical disk device basis), however, it is better to accept a read/write request for the volume even during copying the volume.

Further, when copying the volume, a copy of the data in the volume at a point of time when starting the copy must be generated. Therefore, a copy process for copying the volume is a process of copying, when receiving the write request to a storage area with the copy being not yet completed during copying the volume, the data to be rewritten due to the write request to at first a copy destination volume.

Specifically, the copy process involves, as schematically illustrated in FIG. 1, interrupting the copy of the data when receiving a write request 51 to the storage area with the copy being not yet completed during copying the copy source volume. The copy process further involves copying the data on a storage area 52, to which the data are requested by the write request 51 to be written, to a corresponding storage area 52' of a copy destination volume, and thereafter making a response to the write request 51. Note that the phrase "making the response to the write request 51" implies "writing the data requested by the write request 51 to be written to the storage area 52 and thereafter sending a write completion response to a host."

Thereafter, the copy process involves resuming the interrupted copy of the data (a process of copying only the not-yet-copied data of the copy source volume to the copy destination volume).

Note that the copy process involves, when receiving the write request to the already-copied storage area of the copy source volume/read request to the copy source volume, temporarily interrupting the copy of the data and resuming the copy of the data after making the response to the write request/read request. Further, the following are documents pertaining to copy (backup)-related technologies.

PRIOR ART DOCUMENTS

Patent document 1: Japanese Patent Publication No. 2913840
Patent document 2: Japanese Patent Application Laid-Open Publication No. 09-325863
Patent document 3: Japanese Patent Application Laid-Open Publication No. 2010-66979
Patent document 4: Japanese Patent Application Laid-Open Publication No. 2011-2876

As described above, in the existing copy process, when receiving the write request to the storage area with the copy being not yet completed during the process underway, after copying the data on the storage area to the copy destination volume, the response to the write request is made.

Accordingly, the existing copy process is a process in which an accessing user might feel that the response to the write request is relatively slow. Moreover, if the copy of a certain storage area is completed, the storage areas before and after this storage area must be copied as a separate process. Therefore, the existing copy process is more time-consuming for completing the process than presumed.

SUMMARY

According to an aspect of the embodiments, a storage control apparatus includes:
a copy processing unit to perform a first copy process of copying, when receiving a write request targeting on a write destination address with a copy of a copy source volume to a copy destination volume being not yet completed, write data of the write destination address to the copy destination volume, and to perform a second copy process, when executing a copy process of an overall storage area of the copy source volume, according to a copy sequence on a management area unit basis of management areas into which the overall storage area is segmented; and
a copy sequence resetting unit to reset the copy sequences on the basis of a reception timing of the write request received during the second copy process by the copy processing unit and a write destination address.

According to another aspect of the embodiments, a non-transitory computer-readable recording medium has stored therein a program for causing a computer to execute a process comprising:
performing a first copy process of copying, when receiving a write request targeting on a write destination address with a copy of a copy source volume to a copy destination volume being not yet completed, write data of the write destination address to the copy destination volume,
performing a second copy process, when executing a copy process of an overall storage area of the copy source volume, according to a copy sequence on a management area unit basis of management areas into which the overall storage area is segmented; and
resetting the copy sequences on the basis of a reception timing of the write request received during the second copy process and a write destination address.

According to still another aspect of the embodiments, a copying method of copying data in a copy source volume to a copy destination volume, includes:
performing, by a processor, a first copy process of copying, when receiving a write request targeting on a write destination address with a copy of a copy source volume to a copy destination volume being not yet completed, write data of the write destination address to the copy destination volume,
performing, by the processor, a second copy process, when executing a copy process of an overall storage area of the copy source volume, according to a copy sequence on a management area unit basis of management areas into which the overall storage area is segmented; and
resetting, by the processor, the copy sequences on the basis of a reception timing of the write request received during the second copy process and a write destination address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram of a configuration and a usage mode of the storage control apparatus according to the first embodiment;

FIG. 6 is an explanatory diagram of a management area;

FIG. 7 is an explanatory diagram of a write request occurrence status management map;

FIG. 11 is an explanatory diagram of the write request occurrence status management map;

FIG. 12A is an explanatory diagram (part 1) of a procedure of determining copy sequences in the copy sequence resetting process;

FIG. 12B is an explanatory diagram (part 2) of the procedure of determining the copy sequences in the copy sequence resetting process;

FIG. 12C is an explanatory diagram (part 3) of the procedure of determining the copy sequences in the copy sequence resetting process;

FIG. 15A is an explanatory diagram (part 1) of the procedure of determining the copy sequences in the second copy sequence resetting process;

FIG. 15B is an explanatory diagram (part 2) of the procedure of determining the copy sequences in the second copy sequence resetting process; and FIG. 16 is an explanatory diagram of sizes of the respective management area and the copy sequences thereof in the second copy sequence resetting process.

DESCRIPTION OF EMBODIMENTS

Embodiments of the present invention will hereinafter be described in detail with reference to the drawings.

First Embodiment

An outline of a storage control apparatus 10 according to a first embodiment will hereinafter be described with reference to FIGS. 2 and 3.

Figure 1:
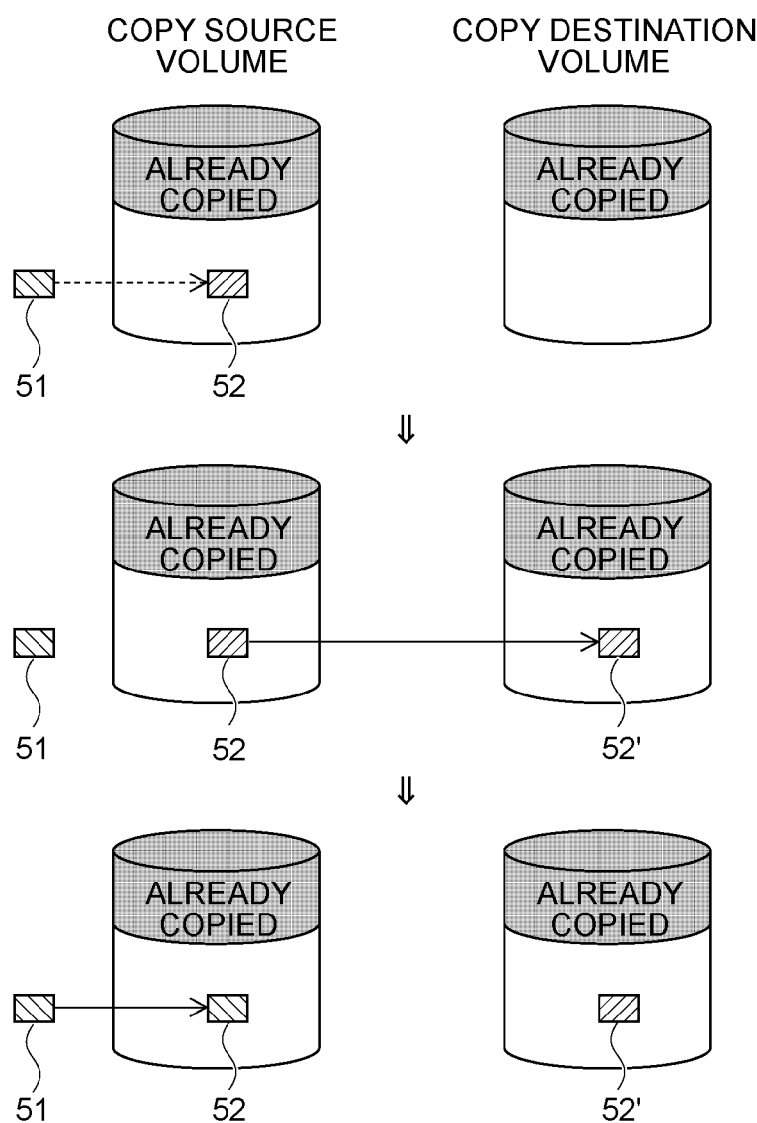
FIG. 1 is an explanatory diagram of an existing copy process.
Figure 2:
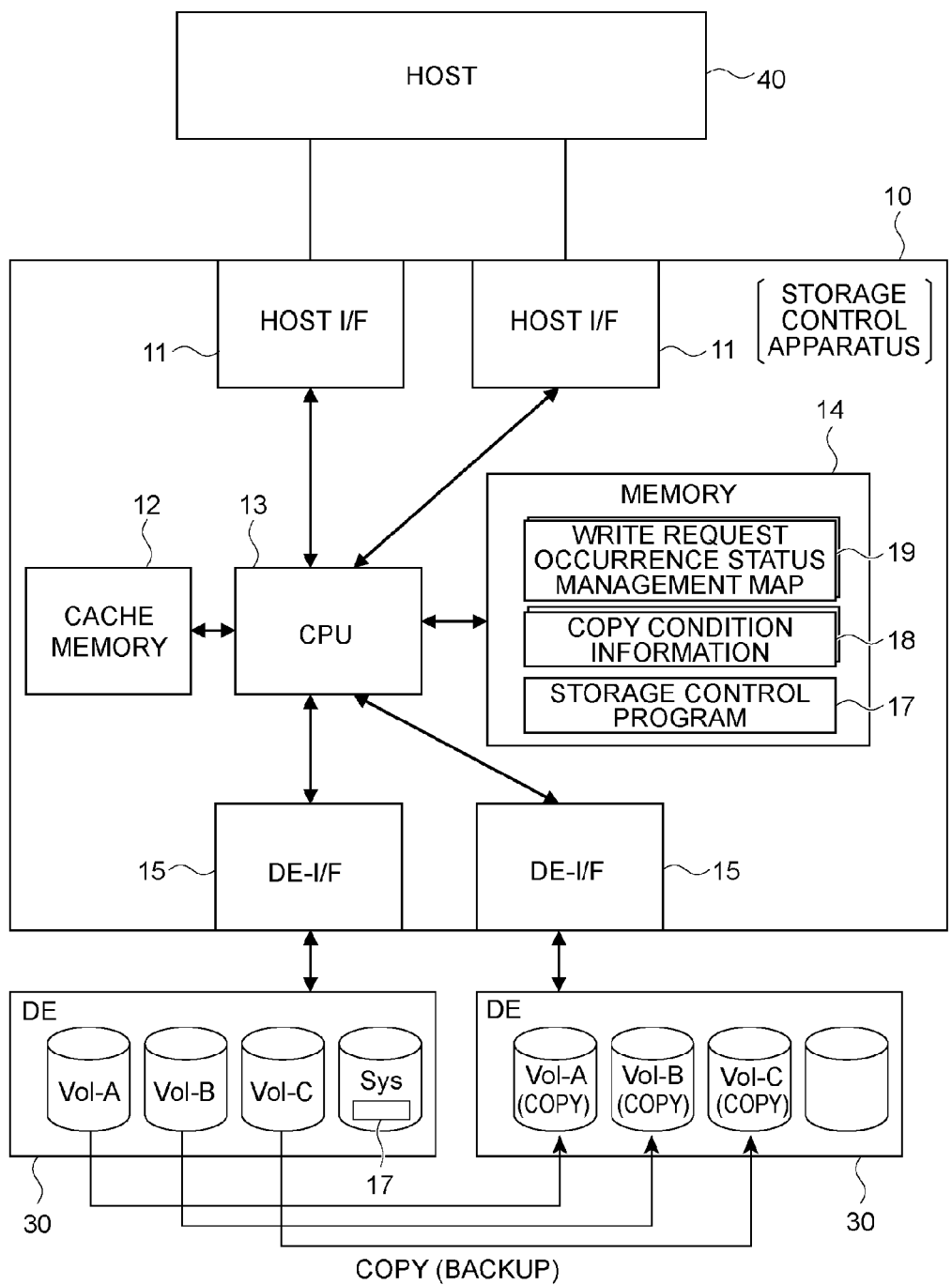
FIG. 2 is an explanatory diagram of functions of a storage control apparatus according to a first embodiment.

As illustrated in FIG. 2, the storage control apparatus 10 according to the first embodiment is an apparatus used (operated) in the way of being connected to one or more (normally a plurality of) drive enclosures (DE) 3 and one or more hosts 40. The storage control apparatus 10 includes two number of host I/Fs 11, a cache memory 12, a CPU (Central Processing Unit) 13, a memory 14 and two number of DE-I/Fs 15.

Each DE 30 connected to the storage control apparatus 10 is a device having a plurality of built-in drives (disk drives or solid-state drives).

The host I/F 11 and the DE-I/F 15 equipped in the storage control apparatus 10 are respectively interface units for performing communications between the host 40 and the DE 30.

The cache memory 12 is a memory provided within the storage control apparatus 10 in order to enable a fast response to an access request given from the host 40. The memory 14 is a main memory of the storage control apparatus 10.

The CPU 13 is a unit that makes the drives within some number of DEs 30 connected to the self storage control apparatus 10 function as a plurality of volumes by executing a storage control program 17 (and OS (Operating System: unillustrated)). This CPU 13, upon being started up, reads the storage control program 17 (and the OS) from a system volume ("Sys") onto the memory 14 and executes the program 17 according to a program (firmware) on a nonvolatile memory (unillustrated) within the storage control apparatus 10.

The CPU 13 executing the storage control program 17 has a function of starting, for example, as illustrated in FIG. 3, a copy process about a volume A from 20:00 p.m. on every weekday of every week, starting the copy process about a volume B from 12:00 p.m. on every Saturday and starting the copy process about a volume C from 6:00 a.m. on every Sunday according to setting (copy condition information 18 on the memory 14; details thereof will be described later on). Note that the copy process executed by the CPU 13 is a process of preparing a copy of data at the point of time when starting the copy process within a copy destination volume while making the response to the access request given from the host 40 for a copy source volume. In other words, the copy process executed by the CPU 13 is such a process that the data on a storage area have no alternative but to be copied to the copy destination volume before making a response to a write request in the case of receiving the write request to a storage area with the copy not yet completed in the copy source volume.

A configuration and an operation of the storage control apparatus 10 according to the first embodiment will be described further specifically based on a premise of what has been explained above. Note that in the following discussion, the host 40 and a computer for the setting operation, which is connected to the storage control apparatus 10, will be termed the host 40 etc. Further, a person (an administrator etc. of the storage control apparatus 10) authorized to conduct the setting for the storage control apparatus 10 will be referred to as a user.

Figure 4:
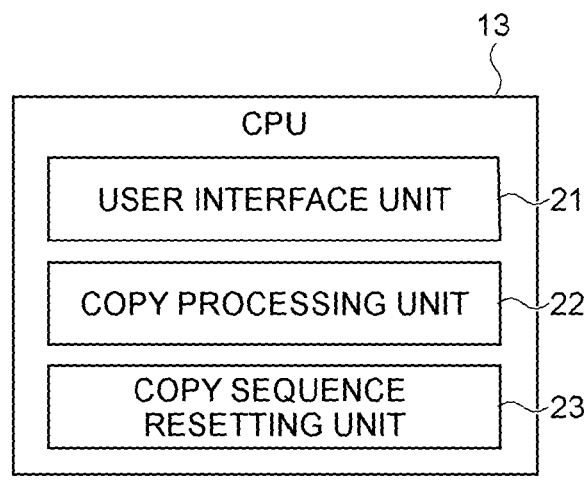
FIG. 4 is a block diagram of a CPU in the storage control apparatus according to the first embodiment.

FIG. 4 illustrates a function block diagram of the CPU 13 within the storage control apparatus 10. As illustrated in FIG. 4, the CPU 13 (executing the storage control program 17) within the storage control apparatus 10 functions as a user interface unit 21 (which will hereinafter be abbreviated to the UI unit 21), a copy processing unit 22 and a copy sequence resetting unit 23.

The UI unit 21 is a unit (function block) that acquires a setting instruction of various items of information and an execution instruction of a variety of processes from the user by displaying a screen etc. for setting copy schedule/map generating condition information on a display of the host 40 etc.

The copy schedule/map generating condition information, which can be set by the user in a way that exploits this UI unit 21 (and the host 40 etc.), is the information containing five types of information given below.

Identifying information of the copy source volume (which will hereinafter be referred to also as a copy source ID);

Identifying information of the copy destination volume to which the data in the copy source volume are copied (which will hereinafter be referred to also as a copy destination ID);

Schedule specifying information for specifying a schedule (such as "from 12:00 on Saturday of every week") on which to copy the copy source volume;

Extraction count (that is an integer of 1 or larger); and

Segmentation count (that is an integer of 2 or larger).

The following is a description of an operation of the UI unit 21 in a case where the user sets the new copy schedule/map generating condition information. Note that in the following description, respective items of element information in the copy schedule/map generating condition information set by the user are termed a processing target copy source ID, a processing target segmentation count, etc. Further, the copy source volume having the processing target copy source ID is referred to as a processing target volume.

The user sets the new copy schedule/map generating condition information, in which case the UI unit 21 at first generates copy condition information 18 and a write request occurrence status management map 19 with respect to the processing target volume on the memory 14.

Figure 5:
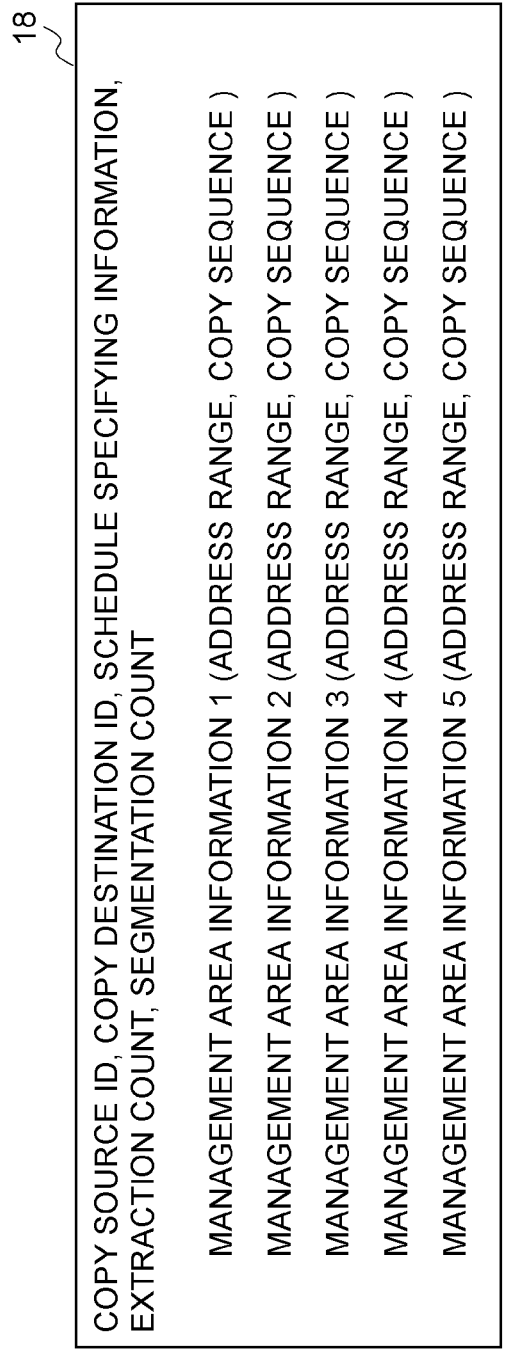
FIG. 5 is an explanatory diagram of copy condition information.

The copy condition information 18 is, as schematically illustrated in FIG. 5, the information containing the respective items of element information of the copy schedule/map generating condition information set by the user and plural pieces (five pieces in FIG. 5) of management area information.

When generating this copy condition information 18, the UI unit 21 generates, to begin with, the copy condition information 18 containing only the element information in the copy schedule/map generating condition information set by the user on the memory 14.

Subsequently, the UI unit 21 calculates an address range of each of the management areas about the processing target volume from the processing target segmentation count and from a capacity of the processing target volume (the copy source volume having the processing target copy source ID). Herein, the "management area" connotes each of the storage areas obtained by segmenting an overall storage area of the processing target volume by the same number as the processing target segmentation count into storage areas each having substantially an equal size. To be specific, for example, if the processing target segmentation count is "5", the UI unit 21, as schematically depicted in FIG. 6, segments the overall storage area of the processing target volume by 5 into the five storage areas (management areas) each having substantially the equal size, and obtains top addresses a-d of the second through fifth storage areas. Then, the UI unit 21 calculates the address ranges (the address 0 through the addresses a-1, the address a through the address b-1, etc.) of the respective management areas from the obtained top addresses a-d and the top and final addresses of the processing target volume.

Thereafter, the UI unit 21 adds, to the processing target copy condition information 18, management area information k containing the address range of a k-th management area counted from the top side of the processing target volume and a copy sequence k (the copy sequence having a value named "k") with respect to each k-value from "1" to the processing target segmentation count.

The write request occurrence status management map 19 generated on the memory 14 together with the copy condition information 18 by the UI unit 21, is a map (table) having a structure (data structure) as illustrated in FIG. 7.

This write request occurrence status management map 19 illustrated in FIG. 7 is the map generated on the memory 14 when the processing target segmentation count is "5". That is, the write request occurrence status management map 19 has a structure capable of storing, on a per management area basis, the number of write requests (write request count) for each management area that are received from the host 40 within a time segment with respect to each of time segments 1-5 (details thereof will be described later on) of which a time segment count is the same as the processing target segmentation count. In the case of setting the new copy schedule/map generating condition information, the UI unit 21 generates, on the memory 14, a null write request occurrence status management map 19 ("null" representing that $n_{x-y}$ values in FIG. 7 are all "0") associated with the processing target copy source ID.

The UI unit 21, which has generated the copy condition information 18 with respect to the processing target volume and the write request occurrence status management map 19 on the memory 14, notifies the copy processing unit 22 of a map generating process request containing the processing target copy ID. Then, the UI unit 21 finishes the process for the newly-set copy schedule/map generating condition information.

Note that the UI unit 21, if the user changes the contents (the schedule specifying information, the segmentation count, etc.) of the copy condition information 18, regenerates the copy condition information 18 and the write request occurrence status management map 19, and thereafter notifies the copy processing unit 22 of the map generating process request. Further, the UI unit 21, if the user gives an instruction of re-executing the map generating process with respect to a certain copy source volume, clears each of the write request counts to "0" in the write request occurrence status management map 19 with respect to the copy source volume, and thereafter notifies the copy processing unit 22 of the map generating process request containing the identifying information of the copy source volume.

Moreover, the UI unit 21, if the user gives an instruction of deleting the copy condition information 18 with respect to a certain copy source volume, at first erases the copy condition information 18 about the copy source volume and the write request occurrence status management map 19 from on the memory 14. Then, the UI unit 21 notifies the copy processing unit 22 of a copy process halt request containing the identifying information of the copy source volume.

A function of the copy processing unit 22 will hereinafter be described. Note that the copy sequence resetting unit 23, which will be described later on, is a unit configured to notify the copy processing unit 22 of a copy process starting request containing the copy source ID as the case may be. Therefore, herein, the operations of the copy processing unit 22 shall be explained in the case of being notified of the map generating process request, the copy process starting request and the copy process halt request in this sequence.

Operation in Response to Map Generating Process Request

When the notification of the map generating process request is given from the UI unit 21, the copy processing unit 22 at first reads the copy condition information 18 containing the same copy source ID as the copy source ID contained in the map generating process request from the memory 14. The copy source volume having the copy source ID contained in the map generating process request will hereinafter be referred to as the processing target volume. Further, the respective items of information in the processing target copy condition information 18, which are read by the copy processing unit 22 from the memory 14, are termed schedule information, management area information, etc. with respect to the processing target volume.

Subsequently, the copy processing unit 22 starts the map generating process in the procedure illustrated in FIG. 8 with respect to the processing target volume. Note that this map generating process is a process started by the copy processing unit 22 each time the map generating process request is given.

Figure 8:
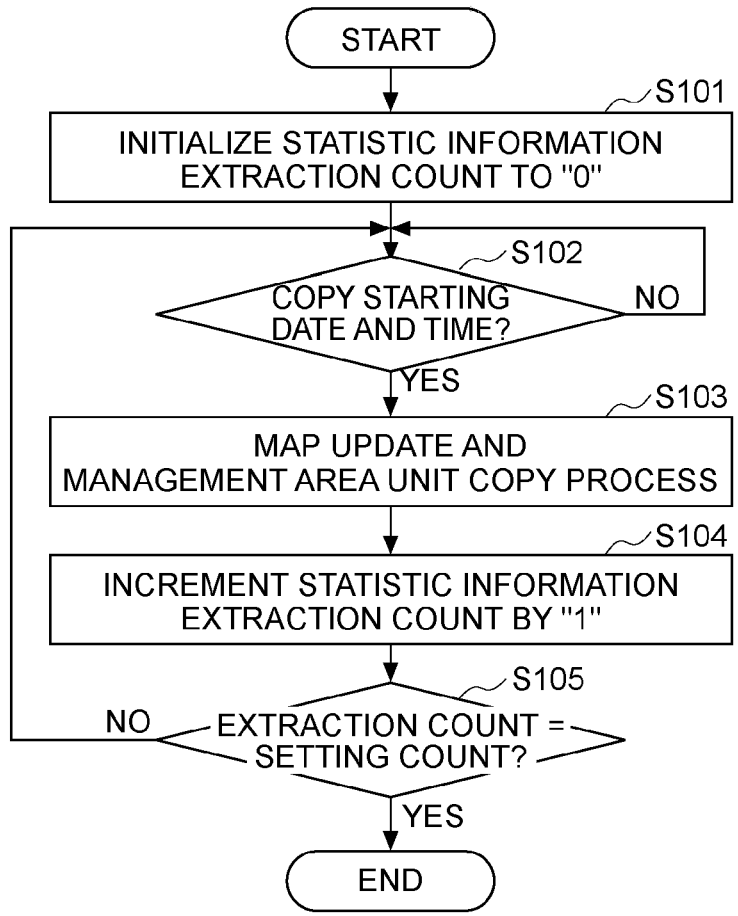
FIG. 8 is a flowchart of a map generating process.

As depicted in FIG. 8, the copy processing unit 22, which has started the map generating process for the processing target volume, at first initializes a statistic information extraction count to "0" that is defined as a variable for storing the execution count of the process in step S103 (step S101).

Thereafter, the copy processing unit 22 stands by till reaching a copy start date and time (see FIG. 3) of the processing target volume on the basis of the schedule specifying information about the processing target volume (step S102; NO). Then, the copy processing unit 22, when reaching the copy starting date and time of the processing target volume (step S102; YES), executes a map update/management area unit copy process in step S103.

Contents of the map update/management area unit copy process will hereinafter be described. Note that in the following discussion, the management area k (k=1 to segmentation count) connotes the storage area of the processing target volume in which the address range and the copy sequence are specified by each piece of management area information k with respect to the processing target volume.

The copy processing unit 22, which has started the map update/management area unit copy process, at first sets "1" in a present copy sequence defined as a variable for storing the copy sequence of the management area (in the copying process underway) about which the copy is to be started from now. Moreover, the copy processing unit 22 sets "1" in a present segment number defined as a variable for storing a segment number (which is "j" of the time segment j) of the time segment (the details thereof will be described later on) to which the present time belongs.

Subsequently, the copy processing unit 22 starts a management area copy process of copying the data on the management area with the copy sequence being coincident with the present copy sequence to the copy destination volume.

When in this management area copy process, the copy processing unit 22 performs also a process of monitoring whether the access request is transmitted from the host 40. Then, the copy processing unit 22, when receiving the access request, processes the received access request basically in the same procedure as the processing procedure by the CPU in the existing storage control apparatus.

To be specific, the copy processing unit 22, when receiving the write request to the storage area with the copy being not yet completed, copies the data on the storage area to the copy destination volume, and thereafter makes a response to the write request. In this case, the copy processing unit 22 executes also a process of storing a purport that the copying of the data on the storage area is completed (a purport that the data on the storage area is inhibited from being copied again). Further, the copy processing unit 22, when receiving another access request (a read request, a write request to the already-copied storage area), makes the response to the received access request without copying the data to the copy destination volume.

Thus, the copy processing unit 22 processes the received access request basically in the same procedure as the processing procedure by the CPU in the existing storage control apparatus. The copy processing unit 22, however, executes also a process of adding, if the received access request is the write request, "1" to the write request count associated with the write destination management area of the write request and with the time segment having the present segment number on the write request occurrence status management map 19.

In the case of completing the management area copy process for a certain management area, the copy processing unit 22 adds "1" to each of the present copy sequence and the present segment number. Then, the copy processing unit 22 starts the management area copy process for the management area with the copy sequence being coincident with the present copy sequence. Note that as obvious from the description give so far, each of the time segments in the write request occurrence status management map 19 (FIG. 7) corresponds to a time range extending from a start of the copy of a certain management area to an end thereof.

The copy processing unit 22 iterates the processes described above, thereby copying the data on the overall management areas (i.e., all the data within the processing target volume) to the copy destination volume. Then, the copy processing unit 22, which has finished copying the data on the overall management areas to the copy destination volume, terminates the map update/management area unit copy process (FIG. 8, step S103).

The copy processing unit 22, which has terminated the map update/management area unit copy process, increments the statistic information extraction count by "1" (step S104).

Thereafter, the copy processing unit 22 determines whether the statistic information extraction count with its value being update (the extraction count in FIG. 8) is coincident with the extraction count (the setting count in FIG. 8) with respect to the processing target volume or not (step S105). If the two counts are not coincident with each other (step S105; NO), the copy processing unit 22 loops back to step S102 and stands by till reaching the copy starting date and time of the next time.

The copy processing unit 22, when the statistic information extraction count gets coincident with the extraction count related to the processing target volume (step S105; YES) terminates this map generating process.

Then, the copy processing unit 22, which has terminated the map generating process, notifies the copy sequence resetting unit 23 of a copy sequence resetting request containing the processing target copy source ID.

Operation in Response to Copy Process Start Request

When the notification of the copy process start request is given from the copy sequence resetting unit 23, the copy processing unit 22 reads from the memory 14 the copy condition information 18 containing the same copy source ID as the copy source ID contained in the copy process start request. Similarly to when making the discussion on the map generating process request, the copy source volume having the copy source ID contained in the copy process start request will hereinafter be referred to as the processing target volume. Furthermore, the respective items of information in the copy condition information 18 read from the memory 14 by the copy processing unit 22 will be termed schedule information, management area information, etc. with respect to the processing target volume.

Figure 9:
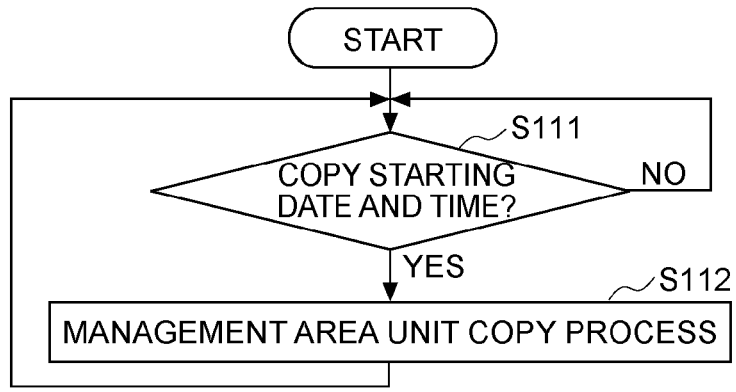
FIG. 9 is a flowchart of a periodical copy process.

The copy processing unit 22, which has read the schedule information etc. with respect to the processing target volume from the memory 14, starts a periodical copy process in the sequence illustrated in FIG. 9. Note that this periodical copy process is, similarly to the map generating process, a process started by the copy processing unit 22 for every copy process start request.

As depicted in FIG. 9, the copy processing unit 22, which has started the periodical copy process, at first stands by till reaching the copy starting date and time of the processing target volume on the basis of the schedule specifying information on the processing target volume (step S111; NO).

The copy processing unit 22, when reaching the copy starting date and time of the processing target volume (step S111; YES), executes a management area unit copy process in step S112.

This management area unit copy process is a process into which the process related to the write request occurrence status management map 19 is removed from the map update/management area unit copy process.

Namely, the copy processing unit 22, which has started the management area unit copy process, sets "1" in the present copy sequence defined as the variable for storing the copy sequence of the management area about which the copy is to be started from now.

Subsequently, the copy processing unit 22 starts the management area copy process of copying the data on the management area with the copy sequence being coincident with the present copy sequence to the copy destination volume.

When in this management area copy process, the copy processing unit 22 performs also the process of monitoring whether the access request is transmitted from the host 40. Then, the copy processing unit 22, when receiving the access request, processes the received access request in the same procedure as the processing procedure by the CPU in the existing storage control apparatus.

To be specific, the copy processing unit 22, when receiving the write request to the storage area with the copy being not yet completed, copies the data on the storage area to the copy destination volume, and thereafter makes a response to the write request. In this case, the copy processing unit 22 executes also the process of storing the purport that the copying of the data on the storage area is completed. Further, the copy processing unit 22, when receiving another access request (the read request, the write request to the already-copied storage area), makes the response to the received access request without copying the data to the copy destination volume.

In the case of completing the management area copy process for a certain management area, the copy processing unit 22 adds "1" in the present copy sequence. Then, the copy processing unit 22 starts the management area copy process for the management area with the copy sequence being coincident with the present copy sequence.

The copy processing unit 22 repeats the processes described above, thereby copying the data on the overall management areas to the copy destination volume. Then, the copy processing unit 22, which has finished copying the data on the overall management areas to the copy destination volume, terminates the management area unit copy process (step S112), then loops back to step S111 and stands by till reaching the copy starting date and time of the processing target volume.

Operation in Response to Copy Process Halt Request

In the case of receiving notification of a copy process halt request from the UI unit 21, the copy processing unit 22 halts the process (which is normally the periodical copy process in FIG. 9 or the map generating process in FIG. 8 as the case may be) being carried out for the copy source volume having the copy source ID contained in the copy process halt request.

An operation of the copy sequence resetting unit 23 will hereinafter be described.

As already explained, the copy processing unit 22, which has terminated the map generating process (FIG. 8), notifies the copy sequence resetting unit 23 of a copy sequence resetting request containing the processing target copy source ID.

Figure 10:
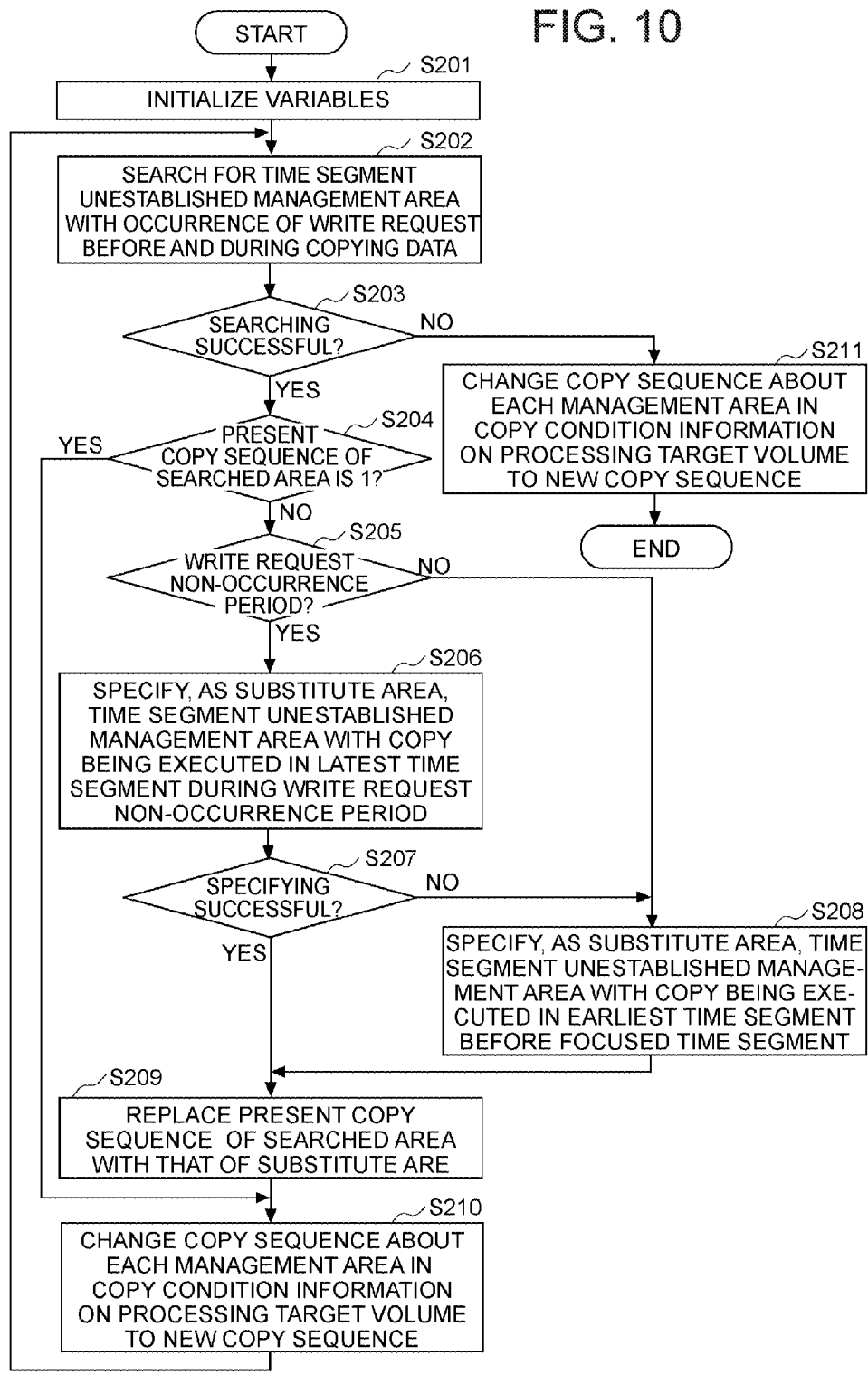
FIG. 10 is a flowchart of a copy sequence resetting process.

The copy sequence resetting unit 23, which has been notified of the copy sequence resetting request from the copy processing unit 22, executes a copy sequence resetting process in the procedure illustrated in FIG. 10.

That is, the copy sequence resetting unit 23 being notified of the copy sequence resetting request, at first, initializes multiple variables used in the subsequent processes (step S201).

The variables initialized in this step S201 include a new copy sequence and a status flag with respect to each management area of the copy source volume (which will hereinafter be referred to as the processing target volume) having the copy source ID contained in the copy sequence resetting request. The new copy sequence is a value that is changed in the copy sequence from the highest quality to the lowest with respect to the associated management area in the copy sequence resetting process, and the status flag is a value (flag) for managing as to whether the copy sequence of the associated management area is established or not. In step S201, the new copy sequence related to each management area is initialized to the copy sequence (the copy sequence in each piece of management area information in the copy condition information 18 on the processing target volume) at that point of time with respect to each management area. Furthermore, the value of the status flag related to each management area is initialized to "unestablished" (e.g., "0") indicating that the copy sequence is not yet established. The management area with the value of the status flag being set to "unestablished" will hereinafter be referred to as a time segment unestablished management area.

The copy sequence resetting unit 23, which has finished the process in step S201, refers to the write request occurrence status management map 19 pertaining to the processing target volume, thus searching for the time segment unestablished management area in which the write request occurs before/during copying the data (step S202). Herein, the phrase "before/during copying the data" connotes "before or during executing the copy about the self management area". Further, the process in step S202 is a process of searching for the time segment unestablished management area satisfying the condition described above in an ascending sequence of the present copy sequence.

If the time segment unestablished management area satisfying the condition described above can be searched for (step S203; YES), the copy sequence resetting unit 23 determines whether the present copy sequence of the searched management area (which will hereinafter be simply termed a searched area) is "1" or not (step S204). In other words, in this step S204, the copy sequence resetting unit 23 determines whether or not the time segment in which to execute the copy of the searched area is a time segment 1 defined as the first time segment.

If the present copy sequence of the searched area is "1" (step S204; YES), the copy sequence resetting unit 23 changes the value of the status flag of the searched area to "established" (e.g., "1") indicating a purport that the copy sequence is established (step S210). Thereafter, the copy sequence resetting unit 23 restarts the processes from step S202.

Whereas if the present copy sequence of the searched area is not "1" (step S204; NO), the copy sequence resetting unit 23 determines whether a write request non-occurrence period exists or not (step S205). Herein, the "write request non-occurrence period" connotes a series of continuous time segments starting from the time segment 1 (only the time segment 1, time segments 1-2, time segments 1-3, etc.) in which the write request for the searched area does not yet occur.

If the write request non-occurrence period does not exist (step S205; NO), the copy sequence resetting unit 23 specifies, as a substitute area, the time segment unestablished area in which the copy is performed in the earliest time segment before the time segment where the copy of the searched area is conducted (which will hereinafter be termed a "focused time segment") (step S208). Note that the process in this step S208 is a process of specifying the searched area itself as the substitute area as the case may be.

The copy sequence resetting unit 23, which has finished the process in step S208, replaces the present copy sequence of the searched area with the present copy sequence of the substitute area (step S209). Then, the copy sequence resetting unit 23 restarts the processes from step S202 onward after changing the status flag of the searched area to "established" (step S210).

Whereas if the write request non-occurrence period exists (step S205; YES), the copy sequence resetting unit 23 specifies, as the substitute area, the time segment unestablished management area in which to perform copying in the latest time segment during the write request non-occurrence period (step S206).

As apparent from the content of the already-explained portion of the copy sequence resetting process (the process in FIG. 10), the process in step S206 is the process of being disabled from specifying the time segment unestablished management area (i.e., the substitute area) satisfying the condition described above as the case may be.

The copy sequence resetting unit 23, if the substitute area can be specified (step S207; YES), performs the processes from step S209 onward. Moreover, the copy sequence resetting unit 23, whereas if the substitute area cannot be specified (step S207; NO), specifies the substitute area by executing the already-explained process in step S208, and thereafter carries out the processes from step S209 onward.

The copy sequence resetting unit 23, if the search in the process of step S202 gets into a failure (step S203; NO), rewrites the copy sequence in the management area information in the copy condition information 18 with respect to the processing target volume to a new copy sequence of the management area (step S211). Then, the copy sequence resetting unit 23, after finishing this copy sequence resetting process, notifies the copy processing unit 22 of the copy process start request containing the processing target copy source ID.

The copy processing unit 22 notified of the copy process start request reads, as already explained, the copy condition information 18 containing the same copy source ID as the copy source ID contained in the copy process start request from the memory 14, and starts the periodical copy process with the content corresponding to the readout information. Accordingly, when copying the processing target volume next time, it follows that the management area copy process with respect to each management area is conducted in the sequence different from the sequence when in the map generating process.

The content of the copy sequence resetting process (FIG. 10) will hereinafter be described in greater detail.

Such a case is considered that a table having contents illustrated in FIG. 11 is generated as the write request occurrence status management map 19 with respect to a certain volume in the map generating process executed for the first time.

As already described, the map generating process (FIG. 8) is a process executed in a status where the copy sequence of the management area k (k=1 through the set segmentation count) is k when executed for the first time. Further, in step S201 of the copy sequence resetting process (FIG. 10), the new copy sequence about each management area is initialized to the copy sequence at that point of time with respect to each management area. Moreover, in step S201, the status flag indicating a status of each management area (indicating whether the copy sequence is established or not) is initialized to "unestablished" indicating the purport that the copy sequence is not yet established.

Accordingly, it is feasible to express, as in FIG. 12A, the new copy sequence (=the copy sequence when in the map generating process) of each management area and the status when completing the process in step S201 and the contents (FIG. 8) of the write request occurrence status management map 19. Note that FIG. 12A and FIGS. 12B, 12C, which will be illustrated later on, are diagrams in which the symbol "x" within a frame associated with the management area X (X=1 through 5) and the time segment Y (Y=1 through 5) represents an occurrence of one write request with respect to the storage area in the management area X within the time segment Y. Further, FIGS. 12A-12C are the diagrams each representing that the copy of the management area X is conducted in the time segment Y in a way that applies the half-tone dot meshing to within the frame associated with the management area X and the time segment Y.

Then, the process in step S202 executed after the process in step S201 is the process of searching for the time segment unestablished management area with the occurrence of the write request before/during copying the data in the ascending sequence of the present copy sequence. Accordingly, the management area 3 is searched for when executing the process in step S202 for the first time. Then, the management area 3 can be searched for (step S203; YES), and hence it is determined in step S204 whether the present copy sequence of the searched area (the management area 3) is "1" or not.

The process (determination) in step S205 is executed because of the present copy sequence of the management area 3 being "3", and the write request non-occurrence period is searched for (the continuous time segments starting from the time segment 1, in which the write request to the searched area does not occur).

In this case (FIG. 12A), the write request non-occurrence period does not exist, and hence the process in step S208 is executed. Then, the focused time segment (the time segment in which the copy of the searched area is carried out) is the time segment 3, so that the management area 1 defined as "the time segment unestablished management area in which to perform copying in the earliest time segment before the focused time segment", is searched for as the substitute area.

Thereafter, the present copy sequence of the searched area is replaced with the present copy sequence of the substitute area (step S209). Namely, the present copy sequence of the searched area (the management area 3), which is kept to be "3" so far, is changed to "1", while the present copy sequence of the substitute area (the management area 1), which is kept to be "1" so far, is changed to "3".

Then, the value of the status flag of the searched area (the management area 3) is changed to "established" (step S201). Accordingly, it follows that there is generated a state where the present copy sequences of the management areas 1-5 become those illustrated in FIG. 12B.

Thereafter, the process in step S202 is executed again, however, the copy sequence of the management area 3 has already been established, and hence the management area 4 is searched for in step S202 of the second time. Then, it is determined in step S204 whether the present copy sequence of the searched area (the management area 4) is "1" or not, however, the present copy sequence of the management area 4 is "4" at that point of time. Therefore, the write request non-occurrence period is searched for (the continuous time segments starting from the time segment 1, in which the write request to the searched area does not occur).

If the contents of the write request occurrence status management map 19 are those illustrated in FIG. 12B (FIG. 11), the time segments 1-3 are the continuous time segments starting from the time segment 1, in which the write request to the searched area (the management area 4) does not occur. That is, since the write request non-occurrence period exists, the management area 1 defined as "the time segment unestablished management area in which to perform copying in the latest time segment during the write request non-occurrence period" is specified as the substitute area.

Then, the substitute area can be specified (step S207; YES), the present copy sequence "4" of the searched area (the management area 4) is replaced with the present copy sequence "3" of the substitute area (the management area 1) (step S209). Subsequently, the value of the status flag of the searched area (the management area 4) is changed to "established" (step S210), and hence eventually it follows that there is generated a state where the present copy sequences of the management areas 1-5 become those illustrated in FIG. 12C.

Thereafter, the process in step S202 is executed again, however, the state illustrated in FIG. 12C is a state of having no existence of the time segment unestablished management area in which the write request occurs before/during copying the data. Therefore, a divergence to the "NO" side is made in step S203, and the new copy sequence of each management area is stored as element information of the copy condition information 18 related to the processing target volume in step S211. Then, upon completing this copy sequence resetting process, the copy processing unit 22 is notified of the copy process start request about the processing target volume. Accordingly, the storage control apparatus 10 comes to a state of copying, when copying the processing target volume next time, the respective management areas in the processing target volume in the sequence depicted in FIG. 12C, i.e., "the management area 3→the management area 2→the management area 4→the management area 1→the management area 5". This sequence "the management area 3→the management area 2→the management area 4→the management area 1→the management area 5" is a sequence having a higher possibility that the copy of the target area of the write request received after generating the map will have already been completed than the original sequence (FIG. 12A) if the reception pattern (the reception count in each time segment) of the write request on which the map is generated based is the same as the reception pattern of the write request after generating the map. Namely, the available sequence is the sequence improved so that the write request count to the storage area with the copy being not yet completed in the statics when in the map generating process is less than the write request count in the statics when in the previous map generating process.

Figure 13:
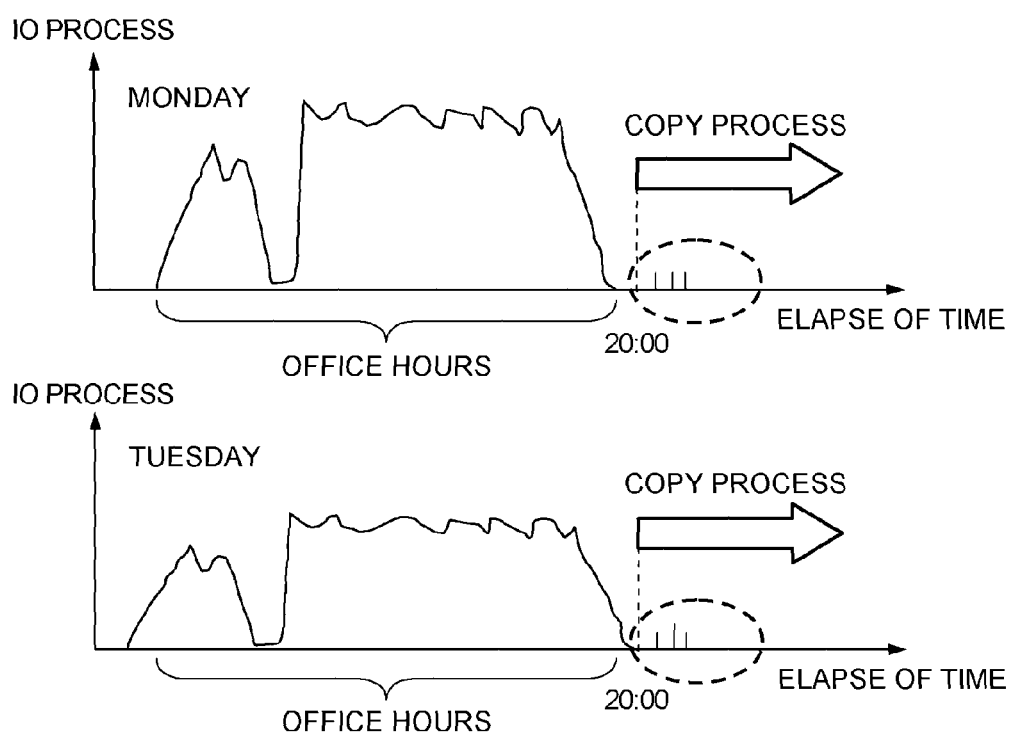
FIG. 13 is an explanatory diagram of an occurrence pattern of a write request to a volume in the copy process underway.

For example, by way a tendency of utilizing the storage device, as schematically illustrated in FIG. 13, the write request to the volume in the copy process underway is frequently given at the same timing (time period). Moreover, because of immediateness among the addresses of the write destinations of the write requests at the respective timings in many cases, if using the storage control apparatus 10 according to the first embodiment, it follows that the volume can be copied (backed up) in such a form that malfunctions derived from receiving the write request to the storage area with the copy being not yet completed, e.g., an interruption of the copy process, a delay of response to the write request due to a standby for completing the copy process, etc. are hard to occur.

Second Embodiment

The storage control apparatus according to a second embodiment is what the storage control apparatus 10 according to the first embodiment discussed above is modified softwarewise. Therefore, the following discussion will be focused on different portions between an operation of the storage control apparatus 10 according to the second embodiment and the operation of the storage control apparatus 10 according to the first embodiment in a way that uses the same reference numerals and symbols as those employed when describing the storage control apparatus 10 of the first embodiment.

Figure 14:
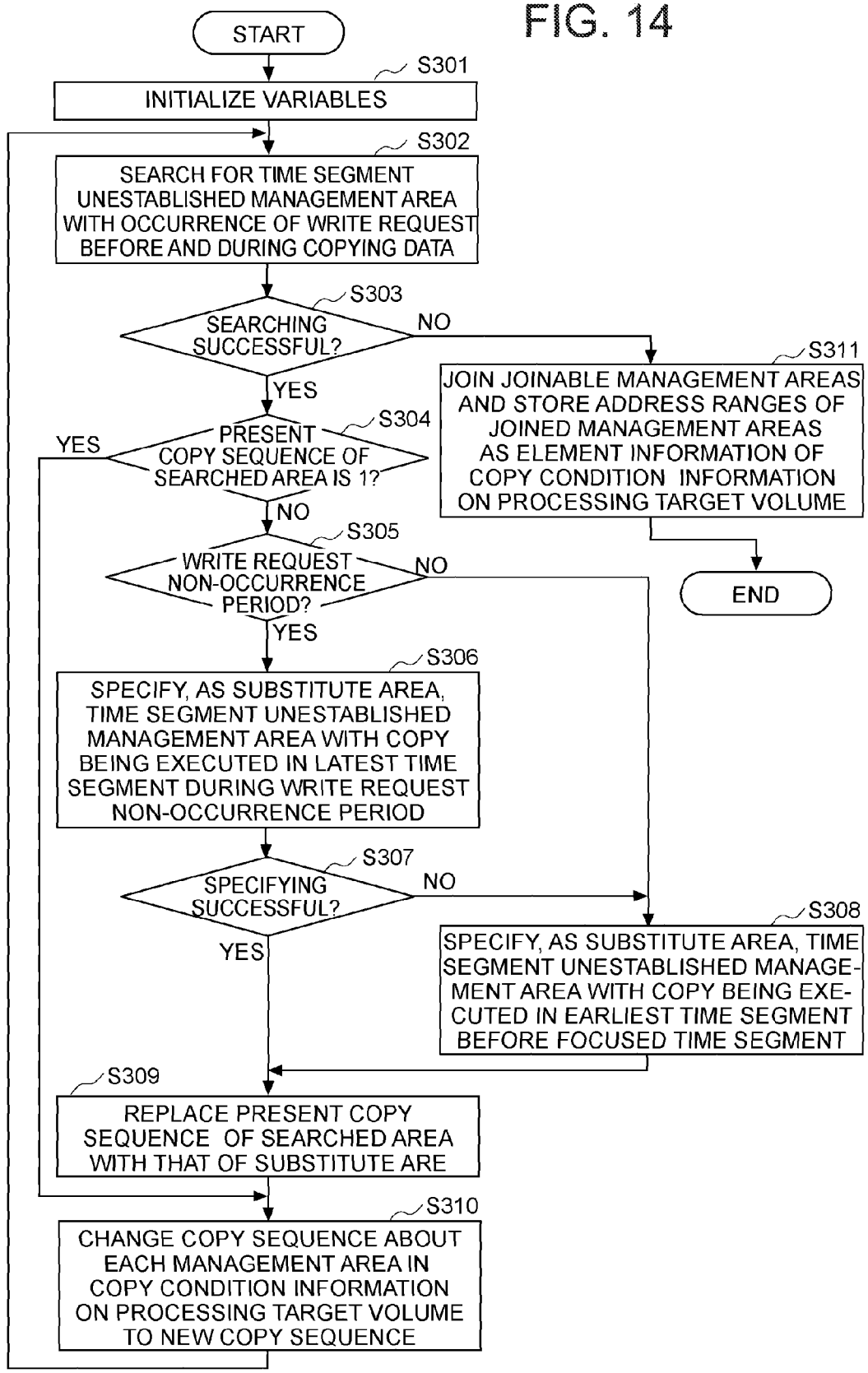
FIG. 14 is a flowchart of a second copy sequence resetting process executed by the CPU in the storage control apparatus according to a second embodiment.

The storage control apparatus 10 according to the second embodiment involves adopting a storage control program 17 for making the copy sequence resetting unit 23 (CPU 13) execute a second copy sequence resetting process illustrated in FIG. 14 by way of the copy sequence resetting process (FIG. 10).

Processes in steps S301-S310 of this second copy sequence resetting process have the same contents as those of the processes in steps S201-S210 of the copy sequence resetting process (FIG. 10).

The second copy sequence resetting process involves, however, executing a process having the following content in step S311 if failing to search for the time segment unestablished management area with the occurrence of the write request before/during copying the data (step S303; NO).

If failing to search for the time segment unestablished management area with the occurrence of the write request before/during copying the data, the copy sequence resetting unit 23 at first determines in step S311 whether joinable management areas exist in the management areas of the processing target volume or not. Herein, "the joinable management areas" connote the continuous management areas (two or more management areas) with the new copy sequences being consecutive within the processing target volume.

If there are none of the joinable management areas, the copy sequence resetting unit 23 performs a process (not illustrated) of replacing the copy sequences within the respective pieces of management area information in the copy condition information 18 on the processing target volume with new copy sequences of the individual management areas. Then, the copy sequence resetting unit 23, after finishing the second copy sequence resetting process, notifies the copy processing unit 22 of the copy process start request containing the processing target copy source ID.

Whereas if there are some pairs of joinable management areas, the copy sequence resetting unit 23 changes the number and contents of pieces of management area information in the copy condition information 18 on the processing target volume so that each pair of management areas are dealt with as one management area.

To be specific, such a case is considered that the new copy sequences and the statuses of the respective management areas when completing the process in step S301 and the contents of the write request occurrence status management map 19, are expressed as in FIG. 15A. In this case, the copy sequences of the respective management areas are changed as illustrated in FIG. 15B, and thereafter it follows that the divergence to the "NO" side is made in step S303.

Then, if the copy sequences of the management areas are as illustrated in FIG. 15B, it follows that the management area 1 and the management area 2 are the joinable management areas (the continuous management areas with the new copy sequences being consecutive in the processing target volume).

Accordingly, the copy sequence resetting unit 23 determines in step S311 that there are the joinable management areas. Then, the copy sequence resetting unit 23 obtains an address range of a new management area 1 (the management area+the management area 2) from the address ranges of the joinable management areas, i.e., the address ranges of the management area 1 and the management area 2. Further, the copy sequence resetting unit 23 temporarily sets the copy sequence of the new management area 1 as any one (the smaller copy sequence in the second embodiment) of the copy sequence of the management area 1 and the copy sequence of the management area 2.

Subsequently, the copy sequence resetting unit 23 renumbers the copy sequence of the new management area 1 and the copy sequences of the old management areas (non-integrated management areas) 3-5 to the copy sequences starting from "1" in the sequence of magnitude thereof. Thereafter, the copy sequence resetting unit 23, after deleting five pieces of management area information in the copy condition information 18 on the processing target volume, adds the management area information containing the address range and the renumbered copy sequence of the new management area 1, and the management area information containing the address ranges and the renumbered copy sequences of the old management areas 3-5 to the copy condition information 18.

Then, the copy sequence resetting unit 23, after finishing the process in step S311 and the second copy sequence resetting process, notifies the copy processing unit 22 of the copy process start request containing the processing target copy source ID.

Therefore, when the copy processing unit 22 executes the management area unit copy process, as schematically illustrated in FIG. 16, it follows that the respective management areas are copied in the sequence such as "the new management area 1→the new management area 4→the new management area 2→the new management area 3" that are approximately twice in size as large as other management areas.

As apparent from the description made so far, the storage control apparatus 10 according to the second embodiment is the apparatus configured to reduce the number of the management areas to a greater degree when setting. Then, the management area unit copy process having the content described above is completed in a shorter period of time generally in the case of the smaller number of management areas. Accordingly, the storage control apparatus 10 according to the second embodiment can be said to be the apparatus superior to the storage control apparatus 10 according to the first embodiment to that degree.

<<Modified Mode>>

The storage control apparatus 10 according to each of the embodiments discussed above can be modified in a variety of forms. For example, the content/processing procedure of the copy sequence resetting process (FIGS. 10, 14) may be contrive to set such sequences as to increase the possibility that the copy of the target area of the write request received after generating the map will have already been completed.

It may be sufficient for the configuration to be just improved so that the write request count with respect to the storage area with the copy being not yet completed in the statistics when in the map generating process is less than the write request count in the statistics when in the previous map generating process.

Accordingly, the copy sequence resetting process can be modified to a process (e.g., a process of obtaining total write request counts with respect to the storage areas with the copies being not yet completed about overall permutations of the copy sequences and selecting the permutation of the copy sequences with the least total write request count) different in terms of the specific content/processing procedure described above.

A further contrivance is that particularly the small write request counts (e.g., 1, 2) on the write request occurrence status management map 19 about the processing target volume can be also changed to "0" in steps S201, S301 of the copy sequence resetting process.

Moreover, the storage control apparatus 10 according to each of the embodiments is the apparatus configured so that the CPU 13 functions as the copy processing unit 22, the copy sequence resetting unit 23, etc. and can be, as a matter of course, modified to an apparatus including hardware functioning as the copy processing unit 22 and hardware functioning as the copy sequence resetting unit 23, separately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus, comprising:
   a copy processing unit that performs a first copy process of copying, when receiving a write request targeting on a write destination address with a copy of a copy source volume to a copy destination volume being not yet completed, write data of the write destination address to the copy destination volume, and that performs a second copy process, when executing a copy process of an overall storage area of the copy source volume, according to a copy sequence on a management area unit basis of management areas into which the overall storage area is segmented; and
   a copy sequence resetting unit that resets the copy sequences on the basis of a reception timing of the write request received during the second copy process by the copy processing unit and a write destination address;
   wherein the copy sequence resetting unit determines, after determining the copy sequences, whether the copy sequences are consecutive and a management area group with addresses being consecutive exists, and changes, when the management area group such as this exists, ranges of the management areas so that the management area group is dealt with as one management area by the copy processing unit.

2. The storage control apparatus according to claim 1, wherein the copy sequence resetting unit determines the copy sequences by determining a time period in which the second copy process of each management area is performed and resets the determined copy sequences on the basis of the write request count of the write requests targeting on the write destination address belonging to each management area in every time period in which the second copy process of each management area is performed.

3. A non-transitory computer-readable recording medium having stored therein a program for causing a computer to execute a process comprising:
   performing a first copy process of copying, when receiving a write request targeting on a write destination address with a copy of a copy source volume to a copy destination volume being not yet completed, write data of the write destination address to the copy destination volume, performing a second copy process, when executing a copy process of an overall storage area of the copy source volume, according to a copy sequence on a management area unit basis of management areas into which the overall storage area is segmented; and resetting the copy sequences on the basis of a reception timing of the write request received during the second copy process and a write destination address;

wherein the resetting determines, after determining the copy sequences, whether the copy sequences are consecutive and a management area group with addresses being consecutive exists, and changes, when the management area group such as this exists, ranges of the management areas so that the management area group is dealt with as one management area in the second copy process.

4. The non-transitory computer-readable recording medium according to claim 3, wherein the resetting determines the copy sequences by determining a time period in which the second copy process of each management area is performed and resets the determined copy sequences on the basis of the write request count of the write requests targeting on the write destination address belonging to each management area in every time period in which the second copy process of each management area is performed.

5. A copying method of copying data in a copy source volume to a copy destination volume, the copying method comprising:

performing, by a processor, a first copy process of copying, when receiving a write request targeting on a write destination address with a copy of a copy source volume to a copy destination volume being not yet completed, write data of the write destination address to the copy destination volume, performing, by the processor, a second copy process, when executing a copy process of an overall storage area of the copy source volume, according to a copy sequence on a management area unit basis of management areas into which the overall storage area is segmented; and resetting, by the processor, the copy sequences on the basis of a reception timing of the write request received during the second copy process and a write destination address;

wherein the resetting determines, after determining the copy sequences, whether the copy sequences are consecutive and a management area group with addresses being consecutive exists, and changes, when the management area group such as this exists, ranges of the management areas so that the management area group is dealt with as one management area in the second copy process.

6. The copying method according to claim 5, wherein the resetting determines the copy sequences by determining a time period in which the second copy process of each management area is performed and resets the determined copy sequences on the basis of the write request count of the write requests targeting on the write destination address belonging to each management area in every time period in which the second copy process of each management area is performed.

* * * * *